United States Patent [19]

Sato et al.

[11] 4,342,106
[45] Jul. 27, 1982

[54] REMOTELY CONTROLLABLE VOICE-OPERATED STARTER FOR TAPE RECORDER

[75] Inventors: Masanobu Sato; Norio Fukuoka, both of Hachioji, Japan

[73] Assignee: Olympus Optical Company, Ltd., Tokyo, Japan

[21] Appl. No.: 40,582

[22] Filed: May 21, 1979

[30] Foreign Application Priority Data

Jul. 20, 1978 [JP] Japan .................................. 53-89005

[51] Int. Cl.³ ........................ G11B 31/00; G11B 19/20
[52] U.S. Cl. ........................................... 369/7; 369/50
[58] Field of Search ................. 179/100.11, 100.1 VC; 360/137; 369/6–7, 50

[56] References Cited

U.S. PATENT DOCUMENTS

| | | | |
|---|---|---|---|
| 2,329,492 | 9/1943 | Thiede | 179/100.11 |
| 2,411,501 | 11/1946 | Brubaker | 179/100.1 VC |
| 2,909,618 | 10/1959 | Zimmermann | 179/100.11 |
| 3,436,662 | 4/1969 | Kobayashi | 179/100.1 VC |
| 4,120,009 | 10/1978 | Iwasawa | 179/100.1 VC |

Primary Examiner—Raymond F. Cardillo, Jr.
Attorney, Agent, or Firm—Weinstein & Sutton

[57] ABSTRACT

A voice-operated starter for tape recorder includes an FM tuner circuit which responds to a frequency modulated wave transmitted from a wireless microphone assembly by producing an output which is fed to a voice-operated starter circuit, thus operating the latter.

6 Claims, 5 Drawing Figures

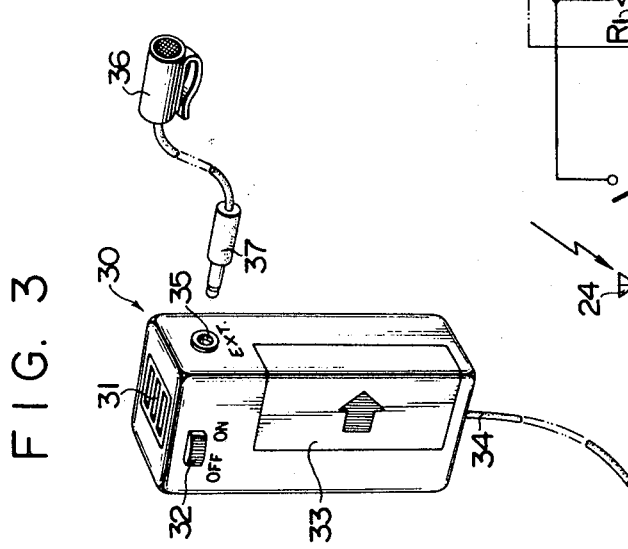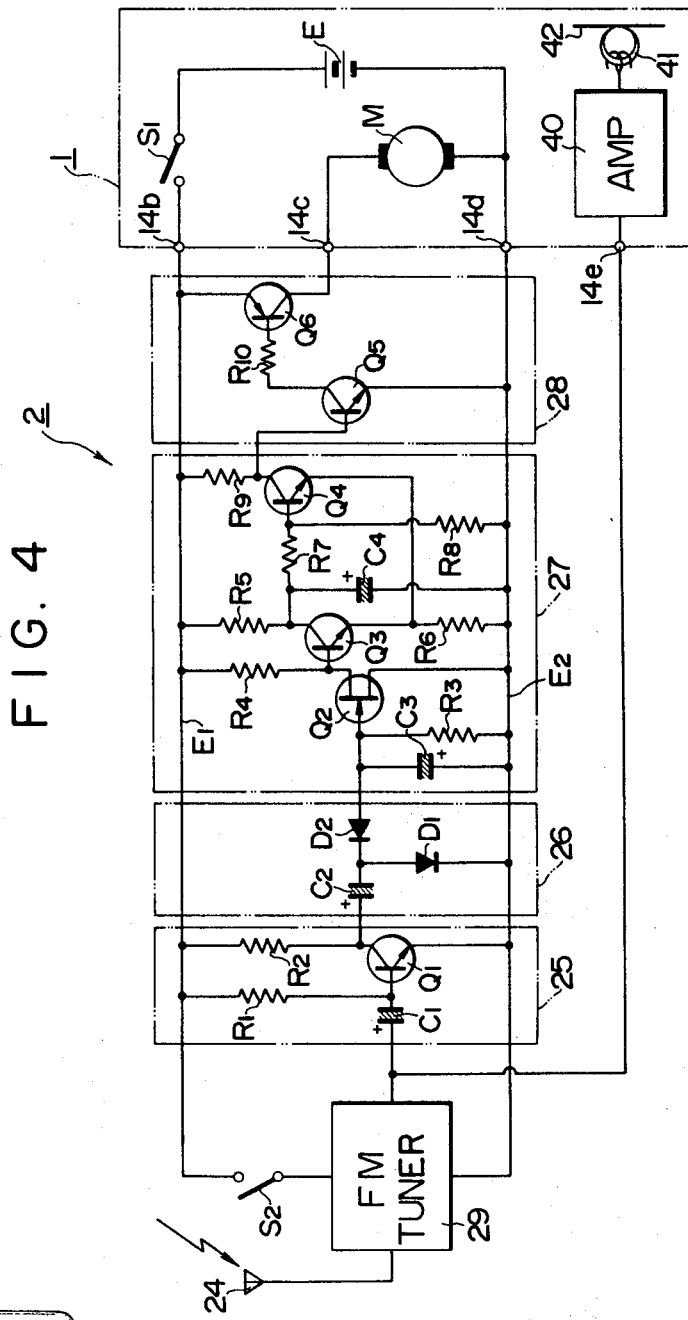
FIG. 3
FIG. 4

REMOTELY CONTROLLABLE VOICE-OPERATED STARTER FOR TAPE RECORDER

BACKGROUND OF THE INVENTION

The invention relates to a voice-operated starter for a tape recorder, and more particularly, to a voice-operated starter which responds to an external voice signal by automatically starting a tape recorder in a record mode.

As is well recognized, a voice-operated starter for a tape recorder responds to a voice input to a recording microphone associated with a tape recorder by operating a switching circuit which connects a tape drive motor of the recorder with a power supply for establishing a record mode of the tape recorder in an automatic manner. This avoids a wasteful power dissipation and enables an efficient use of the power since the connection of the tape drive motor with the power supply is automatically controlled in accordance with the presence or absence of a voice input to the microphone.

A conventional voice-operated starter of this kind used either a microphone internally housed within the tape recorder or an external microphone which is electrically connected with the tape recorder through a connection cord. This prevents the tape recorder from being voice-operated from a remote location for purpose of recording. Rather the recorder has to be located adjacent to the source of voice.

SUMMARY OF THE INVENTION

It is an object of the invention to eliminate the described disadvantage of the prior art, by providing a voice-operated starter for a tape recorder which includes a voice-operated starter circuit preceded by an FM tuner in order to permit the reception of an FM wave transmitted from a wireless microphone which transmits a frequency modulated wave, thus enabling an automatic starting of the tape recorder from a remote location.

In accordance with the invention, there is provided a voice-operated starter for tape recorder which can be conveniently used in recording sound produced in a remote location from the recorder, by automatically starting it or establishing a record standby mode in response to a voice signal contained in an FM wave which is transmitted from a wireless microphone.

BRIEF DESCRIPTION OF THE DRAWINGS

FIG. 3 is a perspective view of an exemplary wireless microphone which is used with the voice-operated starter of the invention;

FIG. 4 is a circuit diagram of the electrical circuit of the voice-operated starter shown in FIG. 1.

DESCRIPTION OF PREFERRED EMBODIMENT

Figure 1:
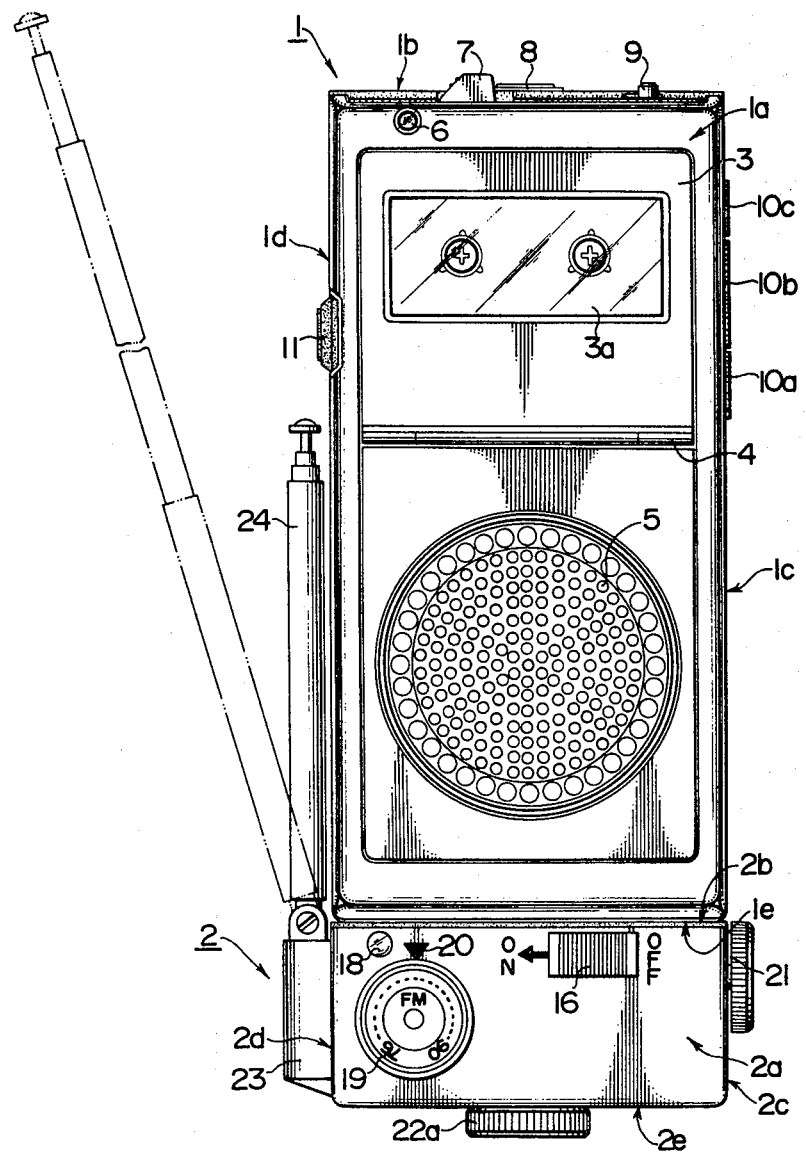
FIG. 1 is a plan view of a voice-operated starter according to one embodiment of the invention which is shown as coupled with a miniature size cassette tape recorder.
Figure 2:
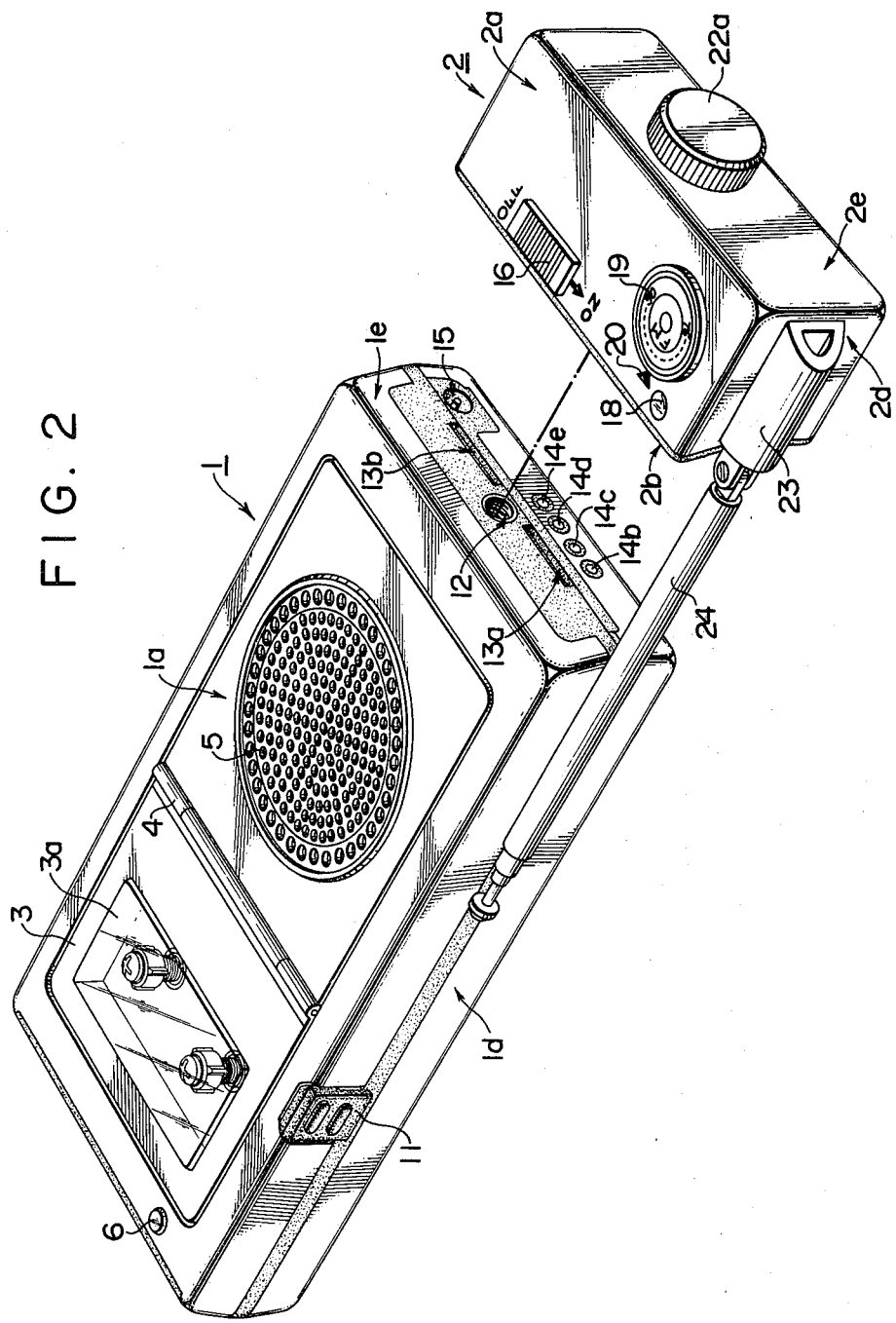
FIG. 2 is an exploded perspective view of the combination of the starter and the tape recorder shown in FIG. 1.

Referring to FIGS. 1 and 2, there is shown a miniature size cassette tape recorder 1 having front panel 1a having an opening formed therein in alignment with a tape cassette receiving chamber which is closed by a cover 3 having sight window 3a formed therein. It will be noted that cover 3 is hinged at 4. Grille 5 is formed below hinge 4 for giving off sound from a loudspeaker (not shown). The recorder 1 includes a top surface 1b in which are disposed operating button 7 for rapid advance and tape rewind, grille 8 associated with an internally housed microphone (not shown) and momentary stop button 9. Operating buttons 10a, 10b and 10c which establishes a record, playback and stop mode of the tape recorder are disposed in the upper region of the right-hand wall 1c of the recorder while a eject button 11 is disposed in the left-hand sidewall 1d for opening the cover 3 and ejecting a tape cassette received in the cassette receiving chamber. Display element 6 is disposed in the front panel 1a adjacent to cover 3, and is used to indicate that a battery voltage is effective for normal operation or that recorder is in a record mode.

The tape recorder 1 has a bottom surface 1e which represents a mating surface with a voice-operated starter 2. As will be noted from FIG. 2, the mating surface 1e is formed with a threaded bore 12, a pair of positioning grooves 13a, 13b, a plurality of connection terminals 14b to 14e, and a jack 15 for connection with an AC adaptor.

The voice-operated starter 2 is adapted to be detachably coupled with tape recorder 1 as will be further described later, and includes front panel 2a in which are disposed operating button 16, tuning dial 19 associated with pointer mark 20 and display element 18. FM tuning knob 21 is disposed in the right-hand sidewall 2c of the starter while an antenna support member 23 is mounted on the left-hand sidewall 2d and is pivotally connected with rod antenna 24. The upper surface 2b of the starter represents a mating surface in which are disposed centrally located threaded bolt (not shown) for engagement with the threaded bore 12, a pair of positioning ribs (not shown) which are adapted to fit in grooves 13a, 13b, a plurality of connection terminals (not shown) which mate with corresponding connection terminals 14b to 14e, and a terminal (not shown) which is connected with the ground, formed by the body of the tape recorder, through the threaded bolt. The coupling bolt extends through the casing of the starter 2 and can be turned therein, with its head 22a projecting from the lower surface 2e of the starter and is provided with a turning knob.

By inspection of FIG. 2, it will be readily apparent that the voice-operated starter 2 can be physically coupled with the tape recorder 1 by bringing the mating surface 2b into abutment against the lower, mating surface 1e of the tape recorder 1, with the ribs fitted into the grooves 13a, 13b and engaging and tightening the threaded bolt into the threaded bore 12. When the both units are coupled together, the connection terminals provided on the part of the starter 2 are electrically connected with the corresponding connection terminals 14b to 14e provided on the part of the recorder 1, whereby an electrical circuit contained in the starter 2 is connected with an electrical circuit of the recorder 1.

FIG. 3 shows an exemplary wireless microphone assembly which transmits an FM wave for automatically driving the starter 2. As shown, microphone assembly 30 has an elongate rectangular configuration so that it can be easily gripped by hand. Grille 31 associated with an internally housed microphone is formed in the top surface 31, while button 32 is disposed in one sidewall adjacent to the top end for turning on and off the supply of an operating voltage to an FM oscillator circuit of known form which is contained therein. A battery receiving chamber is formed in the lower portion of the assembly, and is closed by cover 33. Transmitting antenna 34 formed by a conductive wire depends from the lower surface of the assembly. Jack 35 for connection with an external microphone 36 of a miniature size is disposed in another sidewall, and is adapted to receive plug 37 which is connected with such microphone 36 through a connection cord. Miniature microphone 36 is in the form of a necktie pin to permit an unnoticed recording of conversation or speach by containing the assembly 30 in a pocket. When button 32 is turned to its on position to feed the FM oscillator circuit, a carrier wave is produced, and is frequency modulated by an audio signal derived from the microphone which receives a voice input, with the resulting FM wave being radiated from antenna 34.

FIG. 4 shows an electrical circuit of the starter 2. It is to be noted that the electrical circuit shown in FIG. 4 is limited to that function which is necessary to operate the starter 2, and that other circuits having no direct bearing with the voice-operated starting of the recorder 1 is omitted from illustration.

In FIG. 4, the electrical circuit of the starter 2 includes FM tuner circuit 29 which is responsive to an FM wave received by rod antenna 24, and a voice-operated starter circuit which comprises amplifier 25, rectifier 26, switching level detector 27 and transistor switching circuit 28. The voice-operated starter circuit and FM tuner circuit 29 are connected with tape drive motor M, switch S1, source battery E and amplifier circuit 40 which are contained in the tape recorder 1.

FM tuner circuit 29 is conventional, and may comprise a frequency converter, an intermediate frequency amplifier, an amplitude limiter and an FM detector, all of which are not shown. FM tuner circuit 29 is connected across the battery E in the tape recorder 1 through switch S2, terminals 14b, 14d and switch S1. An output from tuner circuit 29 is fed to the input of amplifier 25 and is also connected to amplifier circuit 40 in the tape recorder 1 through terminal 14e. An output of amplifier circuit 40 is connected with record/playback head 41 which cooperates with tape 42.

Switch S2 is closed when button 16 is thrown to its on position, thus feeding circuit 29 from the battery E of the recorder 1 whenever switch S1 is closed. It then responds to an FM wave received by rod antenna 24 by demodulating it to supply a voice signal which is fed to the voice-operated starter circuit. The voice signal output is also fed to amplifier circuit 40 of the tape recorder 1 so as to be amplified therein before it is fed to magnetic head 41 for recording the corresponding signal on tape 42.

Amplifier 25 comprises transistor Q1 of NPN type constitutes an emitter grounded amplifier together with capacitor C1 and resistors R1, R2. A voice signal supplied from FM tuner circuit 29 is amplified by this amplifier to be fed to the next following rectifier 26. Transistor Q1 has its collector connected through resistor R2 with positive bus E1 which is connected with the positive terminal of battery E in the tape recorder 1 through switch S1, which is ganged with record button 10a, and through terminal 14b, and also connected with one end of capacitor C2 contained in rectifier 26. The transistor has its emitter connected with negative bus E2 which is connected with the negative terminal of battery E through terminal 14d, and its base connected with bus E1 through resistor R1 and also connected with the output of FM tuner circuit 29 through capacitor C1.

Rectifier 26 comprises capacitor C2 and a pair of diodes D1, D2, and functions to rectify an output from amplifier 25 to feed a rectified output to switching level detector 27. As mentioned previously, capacitor C2 has its one end connected with the collector of transistor Q1 and its other end connected with bus E2 through diode D1 and also connected through diode D2 with the gate of field effect transistor Q2 contained in the switching level detector 27.

Switching level detector 27 includes transistor Q2 and transistors Q3, Q4 of NPN type as well as resistors R3 to R9. Transistor Q2 has its drain connected with bus E1 through resistor R4 and also connected with the base of transistor Q3, its source connected with bus E2 and its gate connected with bus E2 through a parallel combination of capacitor C3 and resistor R3. Transistor Q3 has its collector connected with bus E1 through resistor R5 and also connected with bus E2 through capacitor C4, and its emitter connected with bus E2 through resistor R6. Transistor Q4 has its collector connected with bus E1 through resistor R9 and also connected with the base of transistor Q5 contained in the transistor switching circuit 28, its emitter connected with the emitter of transistor Q3, and its base connected with the collector of transistor Q3 through resistor R7 and also connected with bus E2 through resistor R8. Both transistors Q3 and Q4 constitute together a Schmidt circuit.

Transistor switching circuit 28 comprises transistor Q5 of NPN type and transistor Q6 of PNP type as well as resistor R10. It functions to respond to an output from detector 27 by turning transistor Q6 on to feed motor M. Specifically, transistor Q5 has its collector connected with the base of transistor Q6 through resistor R10, and its emitter connected with bus E2. Transistor Q6 has its emitter connected with bus E1 and its collector connected through terminal 14c with motor M, the other end of which is connected with bus E2.

In operation, when the voice-operated starter 2 is physically coupled with the tape recorder 1 and record button 10a and playback button 10b depressed, the depression of record button 10a closes switch S1, whereby the various circuits 25 to 28 in the starter circuit is fed from battery E. At the same time, the record/playback head of the tape recorder 1 bears against the tape, with its pinch roller urging the tape against an associated capstan. It should be understood that the electrical circuit of the tape recorder 1 is then also energized to enable the tape recorder 1 for a recording operation. However, transistor Q6 in the transistor switching circuit 26 remains off, so that motor M cannot be energized to effect a recording operation.

Subsequently, when operating button 16 of the starter 2 is thrown to its on position, switch S2 is closed to feed FM tuner circuit 29 from battery E. By turning tuning knob 21 to tuner circuit 29 with the carrier frequency of the wireless microphone assembly 30, tuner circuit 29 receives an FM wave transmitted from the microphone assembly 30 and thus is capable of operating the starter circuit in response thereto.

Simultaneously, an internal microphone which is housed within the tape recorder 1 in physical alignment with grille 8 is deenergized, whereby it is deactivated. This prevents an interference of an audio output from such microphone with a voice signal from the wireless microphone assembly 30.

By closing operating button 32 provided on the wireless microphone assembly 30 and speaking toward microphone grille 31, the assembly transmits a frequency modulated FM wave from antenna 34. This FM wave is received by FM tuner circuit 29, which demodulates it to produce a voice signal, which is then supplied to amplifier 25 in the voice-operated starter circuit.

The voice signal supplied to amplifier 25 is amplified therein and is then rectified into a negative output signal by rectifier 26. This output signal is phase inverted by field effect transistor Q2 and applied to the base of transistor Q3 in the Schmitt circuit, which performs a level detection and a waveform shaping. The capacitance of capacitor C4 is chosen such that an off output of the Schmitt circuit is maintained for a given time interval, for example, on the order of 2 seconds, so that motor M cannot be immediately deenergized if the voice input is interrupted shortly, thus allowing a continued recording operation. The stretched (i.e. delayed) output from the Schmitt circuit allows transistor Q5 to be turned on, which in turn allows transistor Q6 to be turned on. Thereupon, motor M is connected across battery E through switch S1 to cause a running of tape 42, which in combination with the enabled recorder 1, permits a voice input from the microphone assembly 30 to be recorded therein.

When the voice input from the microphone assembly 30 is interrupted for a time greater than the duration of the off output from the Schmitt circuit which may be on the order of 2 seconds, for example, transistor Q5 is turned off as is transistor Q6, thus deenergizing motor M. This returns the tape recorder 1 to its standby condition again.

It will be noted that when a playback mode of the tape recorder 1 is established and FM tuner circuit 29 contained in the starter 2 is connected with a playback amplifier contained within the tape recorder 1, an FM radio set can be constituted. In this manner, a desired FM broadcasting can be received by turning the knob 21.

While in the above embodiment, the voice-operated starter is separate from and is detachably coupled with the cassette tape recorder so that it can be operated by a wireless microphone assembly, it will be apparent that the voice-operated starter which comprises the FM tuner circuit and the voice-operated starter circuit may be housed within the tape recorder itself.

Figure 5:
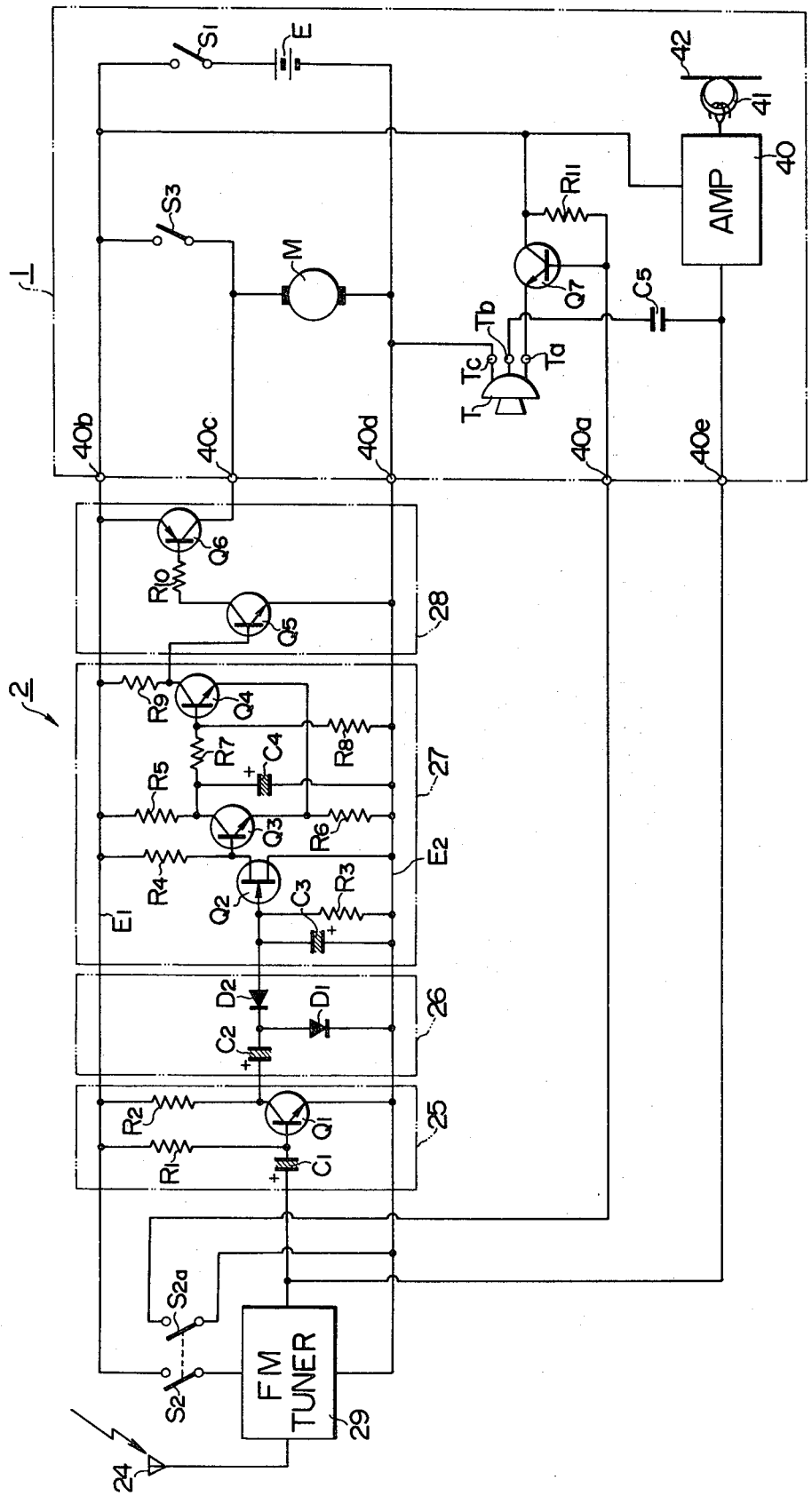
FIG. 5 is a circuit diagram of another form of electrical circuit which is used in the voice-operated starter of FIG. 1.

FIG. 5 shows a modification of the electrical circuit shown in FIG. 4. In this instance, a microphone internally housed within the tape recorder 1 is disabled by the closure of switch S2a which is ganged with switch S2 which is closed as operating button 16 (see FIGS. 1 and 2) of the starter 2 is thrown to its on position after the starter 2 is physically coupled with the tape recorder 1. The electrical circuit shown in FIG. 5 is generally similar to that shown in FIG. 4, and hence corresponding parts are designated by like reference characters, and only the difference will be described below.

In FIG. 5, it will be noted that five connection terminals 40a to 40e are provided in the interface or the mating surfaces of the starter 2 and the tape recorder 1. Control switch S2a which is ganged with switch S2 is additionally provided, and has its one end connected with bus E2 and its other end connected through connection terminal 40a with the base of transistor Q7 which controls the operation of an internally housed microphone T located within the tape recorder 1.

The principal difference of the electrical circuit of the tape recorder 1 shown in FIG. 5 as compared with that shown in FIG. 4 is the provision of control transistor Q7 which has its emitter connected with first connection terminal Ta of the internal microphone T and its collector connected with its base through resistor R11, of capacitor C5 connected between second connection terminal Tb of the microphone and the input of amplifier circuit 40, and of pause switch S3 having its one end connected with motor M and its other end connected with the positive terminal of battery E through switch S1. In other respects, the arrangement is similar to that shown in FIG. 1.

Capacitor C5 represents a coupling capacitor which supplies an electrical output signal from the internal microphone T to amplifier circuit 40 during a normal recording operation of the tape recorder when the starter 2 is not used. It will be seen that an audio output signal supplied to amplifier circuit 40 is amplified therein before it is applied to head 41 to be recorded on tape 42. The junction between the collector of transistor Q7 and resistor R11 is connected through switch S1 with the positive terminal of battery E, thus forwardly biasing transistor Q7. When transistor Q7 is turned on, first connection terminal Ta of the microphone T is fed from battery E through switch S, and thus is enabled for operation. Microphone T has third connection terminal Tc which is connected with the negative terminal of battery E.

As mentioned previously, switch S3 represents a pause switch which momentarily stops a record/playback operation of the tape recorder 1. Switch S3 is normally closed during the use of the tape recorder 1 when the voice-operated starting is not utilized, and is opened only when it is desired to temporarily stop a record/playback operation of the tape recorder 1. However, when the starter 2 is physically coupled with the tape recorder 1, the switch S3 is opened as shown in FIG. 5. It will be seen that amplifier circuit 40 is fed from battery E through switch S1. As shown, bus E1, collector of transistor Q6, bus E2 and the output terminal of the FM tuner 29 contained in the electrical circuit of the starter 2 are coupled with one end of switch S1, one end of motor M, the negative terminal of battery E and the input of amplifier circuit 40, respectively, contained in the electrical circuit of the tape recorder through connection terminals 40b, 40c, 40d and 40e, respectively.

In operation when record button 10a and playback button 10c (see FIG. 1) of the tape recorder 1 are depressed, switch S1 is closed to feed amplifier circuit 40 and to feed a forward bias to transistor Q7 through resistor R11 to turn it on, thereby activating the internal microphone T. The closure of switch S1 is also effective to feed the various electrical circuit of the starter 2 from battery E through connection terminals 40b, 40d. However, under this condition, transistor Q6 in switching circuit 28 remains off, so that motor M is not energized for rotation, preventing an operation of the tape recorder 1.

Subsequently when operating button 16 (see FIG. 1) of the starter 2 is thrown to its on position, switch S2 and control switch S2a are closed in ganged relationship, thus feeding FM tuner circuit 29 from battery E and establishing a standby condition of the starter 2.

The closure of switch S2a is effective to remove base drive from transistor Q7, which is thus turned off, interrupting the power supply to the internal microphone T, which is therefore disabled. As a consequence, an interference of its output developed by a voice signal from the wireless microphone assembly 30 is prevented when the starter 2 is operated in response to an FM wave from the assembly.

In the standby condition of the starter 2, the latter responds to an FM wave from the microphone assembly 30 to start the operation of the tape recorder in the same manner as mentioned above in connection with FIG. 4, thus allowing a voice input to the microphone assembly 30 to be recorded on tape 42. When operating button 16 is returned to its off position, switch S2 and control switch S2a are opened in ganged relationship, whereby FM tuner circuit 29 is disconnected from battery E while transistor Q7 is turned on to feed the internal microphone T from battery E, thus enabling the operation of this microphone T. By closing pause switch S3, a voice input to the microphone T which is coupled to amplifier 40 through capacitor C5 can be recorded on tape 42.

To summarize, the electrical circuit of FIG. 5 is characterized in that operating button 16 of the starter 2 may be operated to actuate ganged switches S2 and S2a, thereby starting the tape recorder 1 in response to a voice input to the wireless microphone 30 while disabling the internal microphone T.

What is claimed is:

1. A voice operated starter for a tape recorder which includes an internally housed microphone, a tape driver motor and a power source and using an external wireless microphone assembly, the starter comprising a voice-operated starter circuit which responds to a voice signal by providing a switching operation which enables a tape recorder to be automatically rendered operative by connecting the motor with the power source, and an FM tuner circuit electrically connected as a preceding stage to the starter circuit and responsive to an FM wave from an external wireless microphone assembly to demodulate said FM wave and to activate the starter circuit, said FM tuner circuit and said starter circuit being electrically connected to and powered by the power source of said tape recorder, and including means for disabling said internally housed microphone when said starter is operative.

2. An external signal operated starter for use with a tape recorder and a wireless microphone assembly, said tape recorder having a tape drive motor and a power source and an internally housed microphone, said starter comprising a starter circuit and receiver means for receiving a radio wave from said wireless microphone assembly, said radio wave being modulated with an external signal and for providing said external signal in demodulated form, said receiver means electrically connected as a preceding stage to said starter circuit, said receiver means and said starter circuit being electrically connected to and powered by the power source of said tape recorder, said starter circuit operating as means for coupling said tape drive motor to said power source upon receiving said demodulated external signal, said coupling means comprising a rectifier connected to said receiver means, a level detector circuit connected to said rectifier for detecting the level of the signal received from said rectifier, and a switching circuit connected to said level detector circuit and adapted to couple said tape drive motor and said power source of said tape recorder upon receiving said demodulated external signal from said receiver means to automatically operate said tape recorder, and including means for disabling said internally housed microphone whenever said starter is operative.

3. A starter as claimed in claim 2, wherein said level detector circuit includes a Schmitt trigger circuit.

4. A starter as claimed in claim 2, wherein said receiver means comprises a frequency modulation receiver.

5. A starter as claimed in claim 2, wherein said external signal comprises speech and said level detector circuit comprises a capacitor for maintaining the output of said level detector circuit between speech pauses for a selected time.

6. A starter as claimed in claim 5, wherein said selected time comprises two seconds.

* * * * *

UNITED STATES PATENT AND TRADEMARK OFFICE
CERTIFICATE OF CORRECTION

PATENT NO. : 4,342,106
DATED : July 27, 1982
INVENTOR(S) : Masanobu Sato

It is certified that error appears in the above—identified patent and that said Letters Patent is hereby corrected as shown below:

In the Specification, in the Description of Preferred Embodiment, column 2, line 17, "a eject button" should read --an eject button--.

Column 3, line 18, "speach" should read --speech--.

Signed and Sealed this

First Day of February 1983

[SEAL]

Attest:

GERALD J. MOSSINGHOFF

Attesting Officer      Commissioner of Patents and Trademarks